July 22, 1941.   D. WRIGHT   2,250,319
BUILDING WALL
Filed Sept. 8, 1938   2 Sheets-Sheet 1

Inventor
David Wright
by McLaughlin & Wallenstein
Attys.

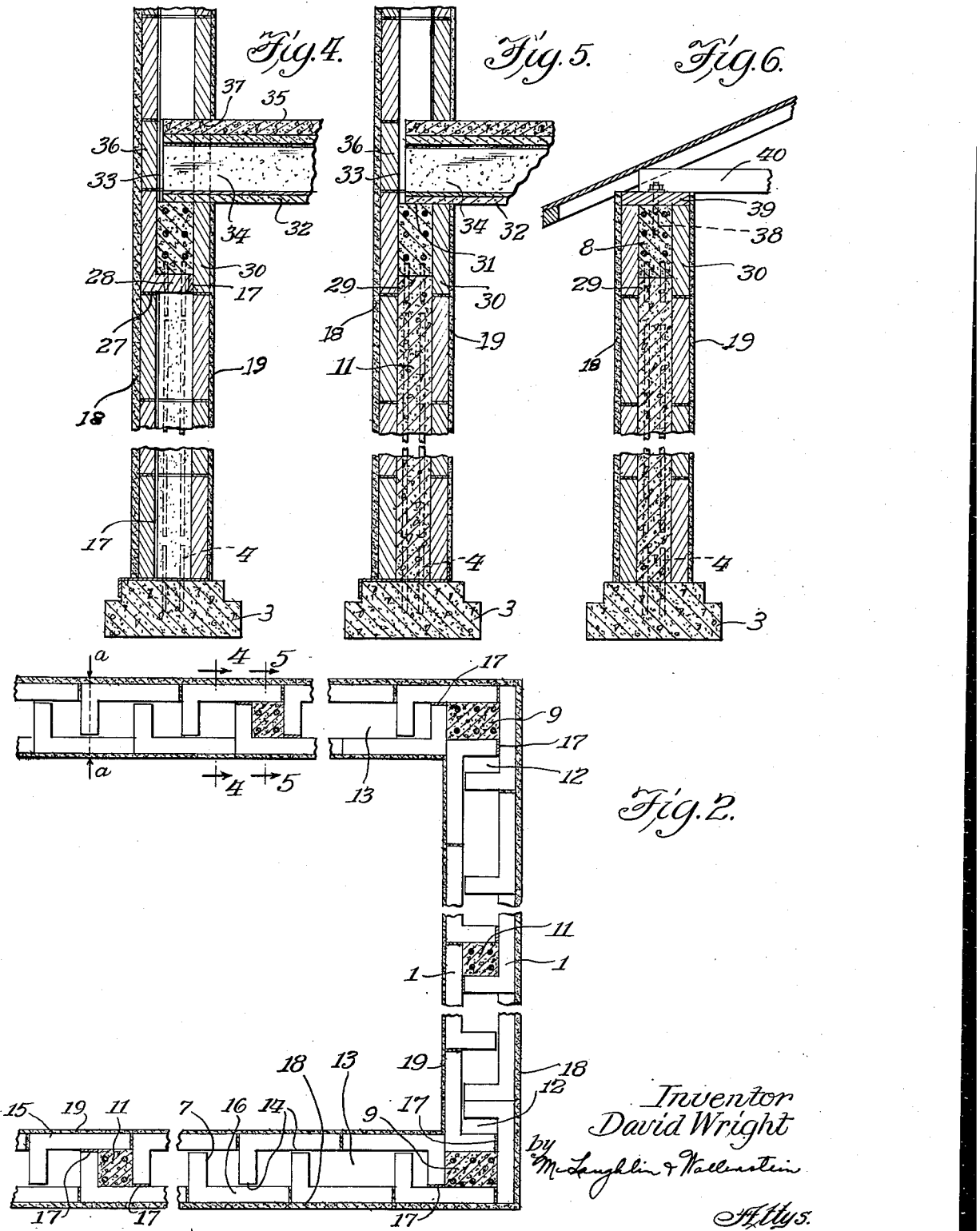

Patented July 22, 1941

2,250,319

UNITED STATES PATENT OFFICE 2,250,319

BUILDING WALL

David Wright, Chicago, Ill., assignor of one-half to Harry T. Bellamy, Chicago, Ill.

Application September 8, 1938, Serial No. 228,913

6 Claims. (Cl. 72—16)

My invention relates to building wall structures, and methods of forming the same. It relates as well as to a novel building unit for use in wall structures, and is directed toward means and methods for producing adequate strength and maximum insulation properties.

There has been a trend for a number of years, becoming more direct as architects and engineers have considered the subject, toward the provision of more effective insulation in buildings. Despite many developments in this direction, practical building construction falls far short of the theoretical possibilities, both from the standpoint of insulation efficiency, permanency of structures, cost of material, and the labor involved.

One problem sought to be met arises by virtue of the fact that suitable insulating materials, such as vermiculite aggregate blocks, for example, lack sufficient strength to bear an adequate load. Proposals to carry the load by other means have been unastisfactory for many reasons known to those skilled in the art. Structures heretofore employed, for example, have permitted seepage of moisture through the outer walls, such as to affect plaster and other finishes employed interiorly. Total costs, also, have been excessive. Placing insulating material, such as rock wool, in open spaces in and around walls will improve the resistance of the wall to heat penetration, but there are many objections to this form of insulation, from the standpoint of cost, deterioration of the insulation material by absorption of moisture, settling, etc., and even initial insulating value, this value being considerably less than is made possible by the fabrication of a wall comprising essentially insulating material.

Expanded vericulite, for example, is an ideal material for insulating purposes, but it has not gone into extensive use for structural purposes, largely because of the existence of problems arising from its use, some of which have been suggested hereinabove. Expanded vermiculite granules have a low bulk density ranging from about five pounds per cubic foot to about twelve pounds per cubic foot, depending on the size of the granules and the nature of the vermiculite. These granules bonded with cement impart to the composition lightness of weight, high resistance to heat flow and valuable acoustical properties. Vermiculite granules, however, have compression strength inadequate for load bearing walls, hence the use of this aggregate in the conventional building units requires a composition with a large proportion of bonding material in order to produce the strength demanded of such building units. By so increasing the bonding material in such building units, the density of the composition is increased, the insulating and acoustical values are reduced, and, in many cases, the use of vermiculite is rendered impractical from a cost standpoint.

The principal object of my invention is to erect a better insulated building, and to obviate the problems discussed hereinabove.

Another object is to produce outer walls of buildings from materials comprising essentially insulating material of low bulk density.

A further object of the invention is to provide a building unit in which expanded vermiculite can be used as the aggregate, bonded with Portland cement or some other suitable bonding material.

A still further object of my invention is to provide an improved construction utilizing units of light-weight porous material such as vermiculite concrete.

I secure the objects of my invention by the use of a novel building unit, and a novel structure of which this unit forms a part. In the preferred embodiment of my invention, as shown and described herein, a building unit is employed composed of a light-weight vermiculite concrete having a density ranging from twenty-five to forty pounds per cubic foot, and is made adaptable by my invention to the construction of load bearing partitions and load bearing exterior walls, even though the compressive strengths of such compositions may not exceed one hundred twenty-five pounds per square inch. Load bearing masonry walls usually require compressive strengths averaging about seven hundred pounds per square inch of unit area.

Referring to the drawings:

Fig. 2 is a fragmentary horizontal plan sectional view showing the unit of Fig. 1 in an outer wall in accordance with a preferred form of my invention;

Fig. 4 is a vertical section, such as would be taken through the wall on the line 4—4 of Fig. 2, looking in the direction of the arrows, the figure showing also a load bearing beam;

Fig. 5 is a vertical section of the wall through a column as at 5—5 in Fig. 2; and Fig. 6 is a vertical section of the wall through a column showing the method of joining roof plate and roof joists.

Figures 1, 3:
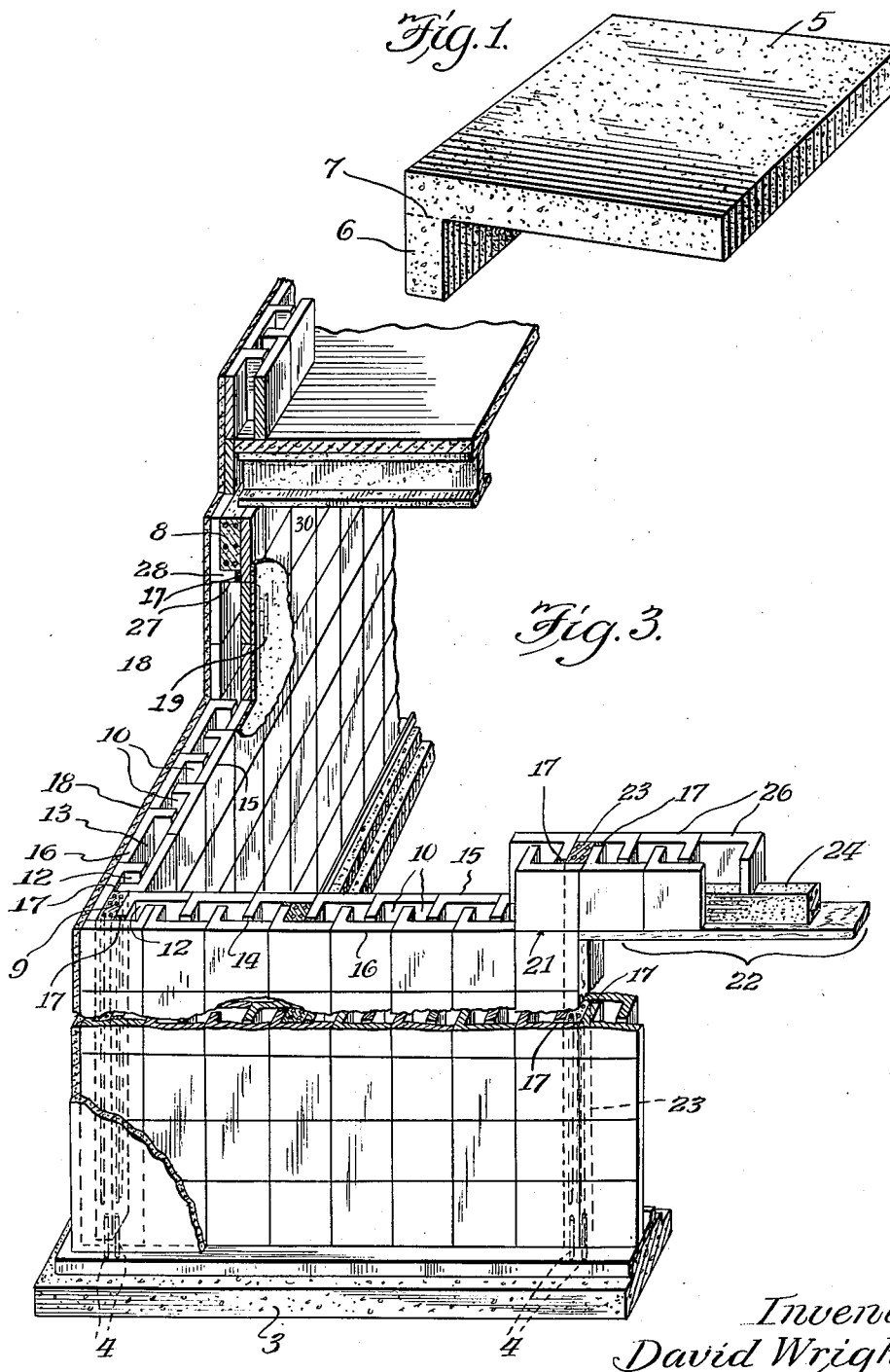
Fig. 1 is a perspective view showing one embodiment of a building unit as employed in my invention.
Fig. 3 is a fragmentary, perspective view, partly in section, of a wall showing the preferred arrangement of the building units to construct load bearing columns, horizontal beams, lintels and joist supports.

In describing the invention as illustrated in the drawings, I shall refer to the use of vermiculite aggregate as the preferred material for the novel building unit, and, for the further guidance of those skilled in the art, shall give illustrative figures including dimensions, etc. These figures are not to be considered as limiting the invention, as the scope thereof is defined in the appended claims.

In practicing my invention, I preferably first build a concrete foundation or concrete basement wall 3 (Fig. 3) and imbed in it vertically protruding rods 4 in suitable customary manner where concrete columns are to be cast onto a foundation or wall.

There are many systems of arranging my units in a wall depending on the dimensions of the unit and the type and dimensions of the wall to be constructed.

I show, in Figs. 2 and 3, my preferred construction of an eight inch wall with a unit as illustrated in Fig. 1, in which the wall face of the unit designated as 5 is 11¾ x 11¾ x 2 inches thick and the leg 6 is 11¾ x 3½ x 2 inches thick. Units of these dimensions when laid in mortar make a square foot of wall area and when laid as shown in illustrations comprise the only shapes required to form an eight inch wall except to fit around openings, load bearing beams and joists as to be subsequently described. Furthermore, this arrangement forms vertical columnar spaces 4x6 inches on the corners thereby providing forms for pouring corner columns 9 and four inch by four inch spaces 10 on twelve inch centers along the wall, thereby providing forms for the intermediate columns when required, such as 11. The exceptions in these uniform columnar spaces are the two two-inch by two-inch spaces 12 and the one four inch by ten inch space 13 which may occur in each wall near the corner.

I prefer to make my units of vermiculite concrete comprising six volumes vermiculite aggregate to one volume Portland cement and dampen the mix with water to produce a moldable composition. The units may be made by molding or forming face 5 and leg 6 as an integral unit but when rectangular slabs such as 5 and 6 may be more economically produced than the formed unit, such slabs may be cemented together as along the dotted line 7 (Fig. 1) to form an integral unit. When using vermiculite concrete as above, I join slabs 5 and 6 together with a cement paste which forms a joint at 7 equally as strong as when 5 and 6 are molded together.

I prefer to form the leg 6 one-half inch less than the distance required to butt against the corresponding wall face on the other tier of units thus providing a space 14 (Fig. 2). The reason for this space is that moisture travels through porous materials by capillarity and, by breaking the continuity of the porous wall, moisture travel by this means is stopped. By this novel method of construction, the inner wall of the structure is entirely separated from the outer wall by an air space except where the inner and outer walls adjoin a concrete column or beam. However, concrete is substantially impervious to moisture; hence there is no moisture travel through the wall at any point.

Each tier of units is laid up in mortar and, for convenience in maintaining the space 14 between the inner unit 15 and the outer unit 16, a spacer of metal or other suitable material, as shown at 17, may be used. This spacer 17 may be removed or left in place if it has non-capillary properties.

The outer face 18 of outer units 16 is intended to serve as the base for stucco shown at 18' (Figs. 2 and 3) or for other customary weatherproof materials such as tile, face brick and enameled iron. Wood, asbestos and other composition shingles may also be applied to the face of the units since vermiculite concrete may be nailed to.

While all such facing materials are normally resistant to moisture penetration; cracks and other types of failure occur whereby water soaking into the wall would travel through to the inner surface of porous material if an air space such as 14 were not provided.

The inner surface 19 of inner units 15 provide an excellent base for plaster, as shown at 19' (Figs. 2 and 3) thereby avoiding the necessity of furring and lathing.

As previously set forth, the inwardly projecting legs 6 of the outer tier of units 16 and the outwardly projecting legs 6 of the inner tier of units 15 form columnar space providing forms into which concrete may be poured for the load bearing columns. Air spaces at 14 may be stripped to seal the form, using the strips 17, for example, as previously described. In addition to this feature, the same structure provides the insulation of the concrete sections, two inches of insulating concrete on each side of such concrete sections. Using units of vermiculite concrete, which has a conductivity or K value of 0.85 B. t. u./sq. ft./1" thick/hr./degree F. temp. diff., the heat conductivity or U value through the load bearing wall sections as at 5—5 (Fig. 2) is approximately 0.17 B. t. u./sq. ft./hr./degree F. temp. diff., without including the insulating value of the outer surface of stucco, brick or shingles or the inner surface of plaster or wall board. The conductivities of U values through the wall, as at 4—4 and along the line A—A of Fig. 2, are approximately 0.15 and 0.098 B. t. u./sq. ft./hr./degree F. temp. diff., respectively. The provision for these high insulation values through the various wall sections are one of the important features of my invention. Steel framing, uninsulated concrete and the webs of other common masonry units having comparatively high heat conductivities, not only lower the overall insulating efficiency of the wall in which they are incorporated but produce local areas of condensation on the interior wall surfaces resulting in discoloration of the surfaces, warping of wall board, and plaster failures.

As previously set forth, units as shown in Fig. 1 are practically the only shapes required to construct an entire eight inch wall, and since the composition comprising the units can be sawed like wood, smaller units or slabs may be cut as required on the job.

When the wall is erected to the height 21 as shown in Fig. 3, of window or door openings 22, column 23 is poured to height 21 and a lintel 24 is poured to span the opening 22. The units may be sawed or molded to provide the form for the lintel and to place on top of lintel to maintain the unit height of 11¾ inches and the wall continued on up to the height 27 at which load bearing beam 8 is to be constructed. At this stage of the construction, concrete is poured in the columnar spaces to produce corner columns 9 and intermediate columns 11 as desired. It is often desirable to fill out columns 23 previously formed at openings.

To form the beam 8, units may be placed with the leg 6 at the bottom, as shown at 28, to cover the openings such as 10, 12 and 13 providing the bottom form for beam 8. Where a leg 6 of units positioned as at 28 covers any of the concrete columns 9, 11 and 23, the leg 6 is sawed out at this place as shown at 29 (Fig. 5). The face 5 of unit as shown at 28 provides the outer side of form for beam 8. The inner side of form for beam 8 is provided by slabs 30 which are preferably 1¾ inches thick to provide a 4 inch bearing surface for joist 32 and allow an expansion space 33. The beam 8 is reinforced and anchored to the reinforced columns in a suitable manner.

Slabs 34 are sawed or molded to fit in between joists and to fill up to bottom level of floor 35. Slabs 36 are placed in outer wall to maintain unit height so units may be built on up from floor level 37.

Fig. 6 shows the preferred construction for fastening to a beam 8 with anchor bolts 38 a plate 39 on which roof joists 40 may be placed.

It is understood that the specific shape and size of my building unit and the specific wall described as the preferred construction embodying my units have been disclosed merely for purposes of illustration, and the scope of my invention is by no means limited thereto. On the contrary, the specific illustrations are susceptible of wide variation by omission, addition and substitution, as will appear to those skilled in the art.

As an example, instead of using two tiers of my units in a wall, one tier may be used to serve as the inner wall surface and for the outer wall surface a facing wall of masonry or metal lath may be attached for a stucco base. Also, a single tier of my units may serve as the outer wall surface to which weatherproof facing is applied, and for the inner wall surface one may attach metal lath for the plaster base, or a solid plaster base, or insulating board.

In such constructions, my units can be arranged to provide the insulation and three sides of the forms for the load bearing columns and beams, the fourth side being provided by the cooperating wall material.

Instead of forming the units of Fig. 1 of vermiculite, other light weight porous aggregates may be employed, such as cinders, blast furnace slag, pumice, bloated clay or the like, or mixtures of such materials. Because of very definite advantages of employing a vermiculite aggregate, however, this particular type of material is preferred and recommended for most installations.

It is to be understood that usual methods employed in building and similar constructions may be employed with my invention where not inconsistent therewith. For example, the concrete columns, beams, joists, lintels, and the like, may be reinforced in ways customary in this art. In Figs. 2 and 3, I have not indicated the mortar between the units, since to show mortar throughout would tend to detract from the disclosure of the novel features forming a part of my construction.

While my invention has been described by reference to specific embodiments, and by the use of specific illustrative numerical and dimensional details, its scope is limited only by the appended claims.

What I claim as new and desire to protect by Letters Patent of the United States is:

1. A building wall structure, comprising light-weight non-load bearing units and having rectangular wall face members, substantially rectangular wall web members projecting therefrom, said units being laid up in mortar in two tiers forming corners and outer and inner wall faces, with said face members parallel and enclosing a wall space into which said web members project but do not span to bring in contact outer and inner wall face members, said wall web members being superimposed so as to divide the said space into aligned columnar spaces providing suitable forms for concrete load bearing columns, and poured concrete load bearing columns in selected columnar spaces binding together inner and outer wall tiers.

2. A building wall structure as defined in claim 1 wherein said non-load bearing units comprise vermiculite and a binder.

3. A building wall structure as defined in claim 1 wherein said non-load bearing units comprise vermiculite bonded with hydraulic cement.

4. A building wall structure as defined in claim 1 wherein said non-load bearing units comprise vermiculite bonded with hydraulic cement, said units having a compression strength of less than five hundred pounds per square inch, and a density not exceeding forty pounds per cubic foot.

5. A building wall as defined in claim 1, including a weather-proof facing secured directly to the outside wall face formed by said units, and a finishing facing secured to the inside wall face formed by said units.

6. A building wall structure comprising an outer tier of light-weight non-load bearing units providing a base for a weather-proof facing, an inner tier of said units positioned to form with said outer tier, aligned cavities which serve to form and insulate load bearing columns and beams, formed in selected cavities, load bearing columns in selected spaces bonded to said tiers, said outer tier being separated from said inner tier by air space and said load bearing columns, and horizontally extending concrete load bearing members supported on said columns and bonded to contiguous non-load bearing members.

DAVID WRIGHT.